UNITED STATES PATENT OFFICE.

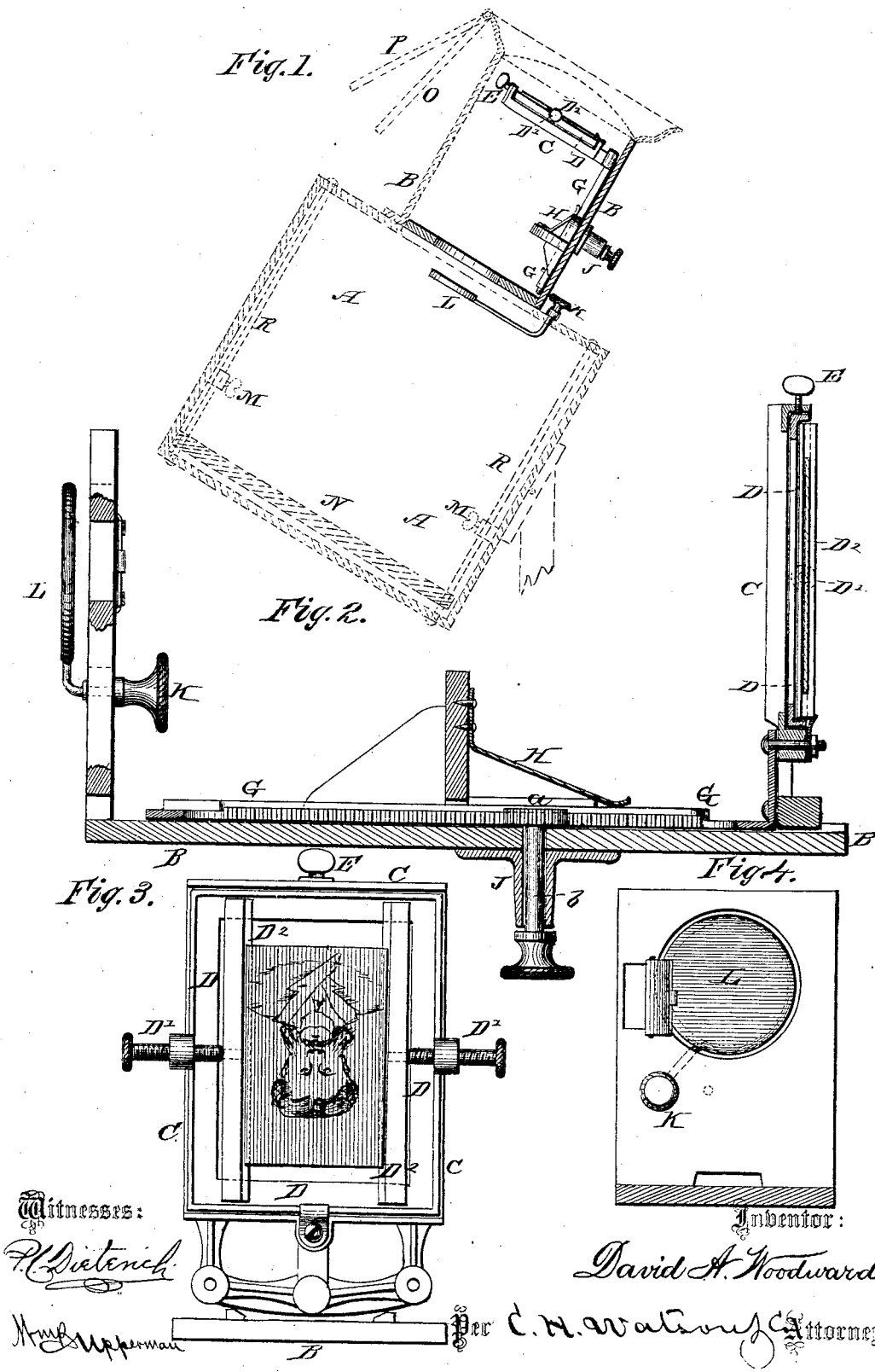

DAVID A. WOODWARD, OF BALTIMORE, MARYLAND.

IMPROVEMENT IN SOLAR CAMERAS.

Specification forming part of Letters Patent No. 195,428, dated September 18, 1877; application filed July 11, 1877.

*To all whom it may concern:*

Be it known that I, DAVID A. WOODWARD, of Baltimore, in the county of Baltimore and State of Maryland, have invented certain new and useful Improvements in Solar Cameras; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to a focusing apparatus and mode of holding and carrying the negative and examining the progress of the printing in solar cameras; and it consists in the construction and arrangement of a carrying-frame and negative-holder, with devices connected therewith, as will be hereinafter more fully set forth.

My invention has for its object to retain the negative exactly in the position in which it is placed by the process of focusing, to allow of using negatives of different sizes with but one negative-frame; also, for the purpose of shifting the negative so as to throw its refracted image on any portion of the prepared paper within the solar-camera box without removing the negative, and also to examine the progress of printing the picture.

In the annexed drawing, which fully illustrates my invention, A represents the dark box of a solar camera with the drum B attached. C is the negative-carrying frame, having the plate-holder D in its place, and firmly secured by a small thumb-screw, E. The carrying frame C has rabbets at the top and bottom for receiving the negative-holder D. The inner sides of this holder are also rabbeted, and through the side edges of said holder are passed screws $D^1 D^1$, the inner ends of which are swiveled in two parallel bars or strips, $D^2 D^2$, of wood or other suitable material. These bars have also rabbets for the negative to rest in, the negative being firmly held by tightening the set-screws $D^1 D^1$.

The negative may be easily adjusted up or down and laterally to either side.

Attached to the carrying-frame C at the bottom is a slide, G, forming a part of said frame, and resting upon supporters on the inside and bottom of the drum B, sliding in a guide, G', perfectly loose and easy.

Although a simple slide may be made to answer the purpose by pushing up or down in the guide G', it is much more convenient to have teeth on one of the edges of said slide, forming a rack, which is moved by a pinion, $a$, attached to a shaft, $b$, passing through a hub, J, on the outside of the drum, and the end of said shaft provided with a suitable knob or head.

When the solar camera is elevated approximating a vertical position, a difficulty occurs in preventing the negative-frame moving of its own weight, or of being slightly moved by such movement of the camera. In order to secure an easy and smooth adjustment of the negative when focusing, and to keep the negative precisely in the place occupied by it when focused, a strong spring, H, is used to bear upon the slide or rack G.

L is the cut-off, made of oiled muslin or any semi-transparent substance, and is moved at pleasure by a knob, K, on the outside of the camera-box, to cut off the sunlight when the operator wishes to view the progress of the print through a small opening on the front end of the darkened box A.

M M are set-screws to hold the paper board N to any required position on the rods R R. P is a transparent cover to be used over the condenser when focusing, and O is a protecting lid or cover.

Having thus fully described my invention, what I claim as new, and desire to secure by Letters Patent, is—

1. The combination of the frames C, slide or rack G, pinion $a$, with shaft $b$, and the spring H, as and for the purposes herein set forth.

2. The spring H and rack G, in combination with the cut-off L and knob B, constructed and arranged substantially as and for the purpose set forth.

3. The frame C, rack G, pitman $a$, shaft $b$, and spring H, in combination with the cut-off L, substantially as and for the purpose specified.

4. The frame C, having holder D, in combination with the rack G, spring H, and strips $D^2 D^2$, substantially as and for the purpose set forth.

In testimony that I claim the foregoing as my own I have hereto affixed my signature in presence of two witnesses.

DAVID A. WOODWARD.

Witnesses:
CHAS. W. BENTLEY, Jr.,
H. L. EMMONS, Jr.